US008055866B2

United States Patent
Haustein et al.

(10) Patent No.: US 8,055,866 B2
(45) Date of Patent: Nov. 8, 2011

(54) MIRRORED STORAGE SYSTEM AND METHODS FOR OPERATING A MIRRORED STORAGE SYSTEM

(75) Inventors: Nils Haustein, Soergenloch (DE); Craig Anthony Klein, Tucson, AZ (US); Ulf Troppens, Mainz (DE); Daniel James Winarski, Tucson, AZ (US); Rainer Wolafka, Bad Soden (DE)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/959,642

(22) Filed: Dec. 19, 2007

(65) Prior Publication Data

US 2008/0168246 A1     Jul. 10, 2008

(30) Foreign Application Priority Data

Jan. 8, 2007    (DE) .................................. 071 00 232

(51) Int. Cl.
     *G06R 12/16*     (2006.01)

(52) U.S. Cl. ................... 711/162; 707/659; 711/167
(58) Field of Classification Search ................ None
See application file for complete search history.

(56) References Cited

U.S. PATENT DOCUMENTS

| 7,085,902 B2 * | 8/2006 | Hayardeny et al. | 711/162 |
| 7,577,805 B2 * | 8/2009 | Amano et al. | 711/161 |
| 7,836,215 B2 * | 11/2010 | Fuente | 710/14 |

* cited by examiner

*Primary Examiner* — Gary Portka
(74) *Attorney, Agent, or Firm* — Roy W. Truelson

(57) ABSTRACT

A mirrored storage system for applications is provided, which enables and supports the variation and dynamic adaptation of the Recovery Point Objectives (RPO) based on policies. Furthermore, methods are provided for running such a mirrored storage system. Said mirrored storage system comprises a first storage system and at least one further storage system, wherein said first and said further storage system are connected via at least one mirror link. An application accesses said mirrored storage system via a network. Therewith, the data to be stored as response to a write command of said application can be mirrored according to a configurable time-varying RPO requirement of the application transmitting the corresponding write command.

19 Claims, 5 Drawing Sheets

MIRRORED STORAGE SYSTEM AND METHODS FOR OPERATING A MIRRORED STORAGE SYSTEM

FIELD OF THE INVENTION

The present invention relates to mirrored storage systems in general and especially to the Recovery Point Objective (RPO) requirement of data mirroring.

BACKGROUND OF THE INVENTION

Mirroring functions include functions such as IBM's DS8000 PPRC (Peer-to-Peer Remote Copy), IBM's DS4000 Enhanced Remote Mirroring, application initiated mirroring like IBM's TSM (Tivoli Storage Manager) Mirroring, software based mirroring such as AIX LVM (Logical Volume Manager) Mirroring, eRDF (Embedded Resource Description Framework), EMC's SRDF, Network Appliance's Snap-Mirror, and IBM's GDPS (Geographically Dispersed Parallel Sysplex).

FIG. 1 represents a mirrored storage system 106, according to the state of the art. Therewith, the data of an application 102 is written to a first storage system 108 via a network 104 and then mirrored to a second storage system 110, usually via a separate mirror link 112, which may be part of the network 104 or which may be in a separate mirror network (not shown). The first storage system 108 is also denoted as primary system, while the second storage system 110 is denoted as secondary system. The storage systems 108, 110 are collectively called the mirrored storage system 106. A mirrored storage system may comprise more than two storage systems interconnected by one or more mirror links. Typically, there are one or more logical mirror pairs 114, 116 which are usually logical drives or LUNs being mirrored. One logical drive of a mirror pair resides in first storage system 108 and the second logical drive resides in second storage system 110. Thereby, one logical mirror pair 114 or 116 has a mirrored relationship.

One important requirement of data mirroring is the Recovery Point Objective (RPO) which determines the maximum delay tolerated for writing to the secondary system and which is usually expressed in minutes. Thus, the RPO describes the grade of identity between the data stored in the primary system 108, on the one hand, and the mirrored data in the secondary system 110, on the other hand. According to prior art, the RPO for a given system is fixed and cannot be adapted dynamically to the requirements of the applications writing to the mirrored storage system. This means the RPO is usually preconfigured by the system architecture and cannot be changed dynamically.

There may be more than one application 102 accessing one mirrored storage system. The RPO may not be equal for all applications accessing a storage system and may not be equal for a given application at any time. In addition, the RPO for one application may be different for particular periods of the day. In order to provide high availability during certain times of the day, an application may tolerate a RPO of 60 up to 120 minutes, for instance during production times when the data is deployed. This means that the storage system is available to the application even though the mirroring relationship or link does not work for 60 up to 120 minutes. During other times of the day, for example when data is written to the storage system, the RPO of an application may be 0 minutes to provide maximum data protection. This means that the mirroring relationship and link 112 are not allowed to be offline.

In addition, there are conflicting goals between high availability and disaster protection. While high availability is focused on instant access to data, disaster protection is focused on protecting the data. More precise, if the mirroring link or relationship fails, high availability requires the system to keep accepting write commands (RPO>0). Conversely, disaster protection requires the system to not accept any write commands because this will cause data inconsistencies between the two mirrored systems (RPO=0). Usually, these two requirements are not present at the same instant in time.

SUMMARY OF THE INVENTION

So, the object of at least an embodiment of the present invention is a mirrored storage system for applications, wherein an application accesses said mirrored storage system via a network and wherein said mirrored storage system comprises a first storage system and at least one further storage system, said first and said further storage system being connected via at least one mirror link. Additional objects of another embodiment of the present invention are methods for running such a mirrored storage system.

Another object of at least an embodiment of the present invention is to provide a mirrored storage system which enables and supports the variation and dynamic adaptation of the RPO based on policies, and to provide methods for operating such a mirrored storage system.

The mirrored storage system according to a particular embodiment comprises: an application response module, giving response to application write commands; a mirror observation module, observing said mirror link and retrieving mirror state information; and a policy module communicating with said mirror observation module and said application response module and having access to the configurable time-varying Recovery Point Objectives (RPO) of the applications accessing said mirrored storage system, wherein said policy module generates an application response for a given application write command on the base of the actual mirror state information and the requirement set of said application for the current time.

It is possible to implement a method for storing data as a response to a write command of said application, wherein said data is mirrored according to a configurable time-varying Recovery Point Objective (RPO) requirement of said application. The RPO is an integer inclusively between zero and a maximum defined value and is measured in minutes. RPO of 0 means that the mirror state must be working and the data between the primary and secondary system is current. An RPO greater than 0, such as T (T>0), means that the currency of the data between primary and secondary system is allowed to be a maximum of T minutes. The measuring of the RPO is not limited to minutes. Alternate embodiments may, for instance, specify the RPO objectives in seconds or other time units. The present invention allows various alternatives for appointing RPO requirements.

In another embodiment of the present invention, the RPO requirement is set and sent by said application as part of a separate command. For example, the SCSI-3 MODE SELECT command can be used with a previously undefined mode page 0x0E to send the RPO requirement in minutes to the mirrored storage system.

In another embodiment of the present invention, the RPO requirements for at least one application are configured and provided independently from said application by a user or the RPO requirements are established on a mirrored system level. In this case, it is advantageous to provide the application RPO requirements as table information. For example, it is then possible to define one or more time ranges with an appropriate RPO requirement for each application accessing the mirrored storage system or to assign an RPO requirement based on the type of the particular application. This embodiment also allows creating application groups with similar characteristics and setting RPO requirements on a group basis, e.g., based on criteria such as criticality, value, or performance requirements. Therefore, changing RPO requirements for a group affects all applications within that group. With this mechanism, it is possible to manage the different RPO characteristics of the applications more efficiently. This greatly supports implementation and management of RPO policies.

In yet another embodiment of the present invention, the current RPO requirement is adjusted automatically by the mirrored storage system depending on its internal state. Specifically, if the primary system is degraded, for instance when the battery to power the non-volatile storage is defective or when a disk drive has failed, the mirrored storage system may enforce a reduced RPO in order to ensure that the complete failure of the primary system does not cause any data loss. For example, the mirrored storage system may change the RPO to zero in order to ensure that the data is available at both systems.

The mirror observation module of the present invention is constituted to monitor the mirror link between the first storage system and the further storage system and to, thus, retrieve mirror state information. In a preferred embodiment of the present invention said mirror observation module is able to identify the mirror state as working, degraded, or offline, and in the case of the latter, to deliver the time that a particular mirror link or mirroring relationship has been offline. The identification of the mirroring state is based on prior art functions of a mirrored storage system: mirrored storage systems usually track the mirroring state and provide interfaces such as a command line interface or application programming interface (API) to determine the state of a mirror or a mirror pair. This information will be considered for further processing of a write command. The offline time may also be used to track any degradation of the mirror state. In addition, the mirror observation module may comprise means to retrieve information about the internal state of the mirrored storage system in order to detect a degradation of the first storage system. The detection of the degradation of a storage system is based on prior art functions: storage systems usually track their state and provide interfaces such as a command line interface and/or an application programming interface to determine the state of the storage system and to detect any system degradation if present. Measures can then be taken to prevent an unrequested loss of data.

Reducing the current RPO time requires special treatment because of the possible presence of data which has not yet been copied to the secondary system when the RPO decrease request comes in. Therefore, the policy module of a preferred embodiment of the present invention comprises a RPO reduction module managing requests to reduce the RPO time, receiving RPO reduction requests and implementing the logic to manage said RPO reduction requests through either implementation or denial. RPO reduction requests are associated with the aforementioned methods for adjusting the RPO requirement. Adjusting the RPO requirement essentially means changing the RPO value. The RPO value can be changed by an application using the exemplary SCSI-3 MODE SELECT command, or the RPO value can be changed based upon a user setting or the state of the system.

The RPO reduction module may implement different strategies to decide about the acceptance of a RPO reduction request. In a first embodiment the system may only allow the reduction of the RPO time if there is no data outstanding for copy to the further storage system. In another embodiment a request to decrease the RPO is only honored if the data outstanding for copy is not older than the new requested RPO time. This embodiment requires that the mirrored storage system track the time a data block has been written to the primary system for as long as it has not been written to the secondary system. If the logic above decides that the RPO reduction request will not be honored then the RPO will not be changed and the associated request will receive a failure indication.

Another embodiment of the present invention applies to where the logic of the RPO reduction module decides that the RPO reduction request will not be honored. In this embodiment the mirrored storage system will start to throttle the I/O requests, such as write commands, from an application in order to prioritize the mirroring. Throttling means that the I/O requests of said application are blocked or delayed by the mirrored storage system. The throttling will be finished if all outstanding data has been copied. Only at that time will the RPO reduction request will be honored. There are different protocol specific means for throttling according to prior art. For example, the IBM Virtual Tape Server (VTS) implements it in the CCW (Channel Command Word) protocol being used for data transfer between a VTS and an application by presenting a BUSY or Channel Command Retry (CCR) status to I/O requests.

In yet another embodiment of the present invention the RPO reduction module will force an immediate synchronization if data outstanding for copy is older than the new requested RPO time. The immediate synchronization can be implemented by increasing the bandwidth of the mirror link. For example, if the customer uses less physical bandwidth than available during normal operation because of traffic shaping, then the allowed bandwidth for the mirror link can be dynamically increased to allow the mirroring system to synchronize. The causal condition is met if the mirrored storage system needs to synchronize immediately. The RPO reduction module may thereby issue a request to a "bandwidth on demand module" which then provides more bandwidth. If the immediate synchronization succeeds the RPO reduction module will instruct the "bandwidth on demand module" to decrease the bandwidth accordingly.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of illustrative embodiments when read in conjunction with the accompanying drawings, wherein:

DETAILED DESCRIPTION

Figure 1:
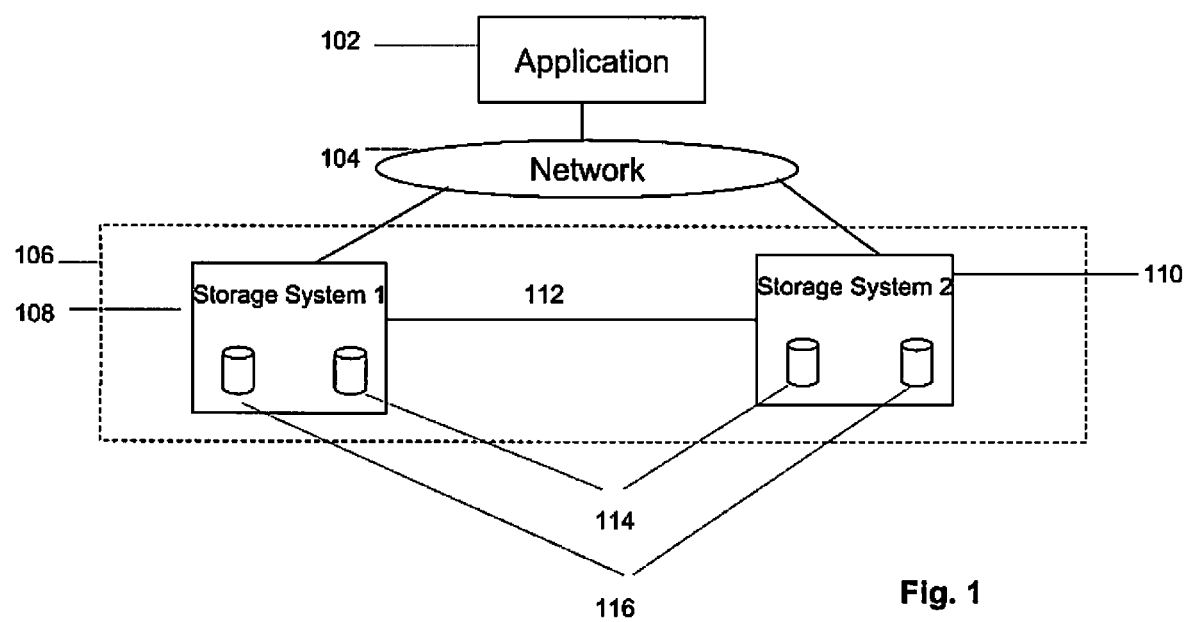
FIG. 1 shows a mirrored storage system according to the state of the art as described above.
Figure 2:
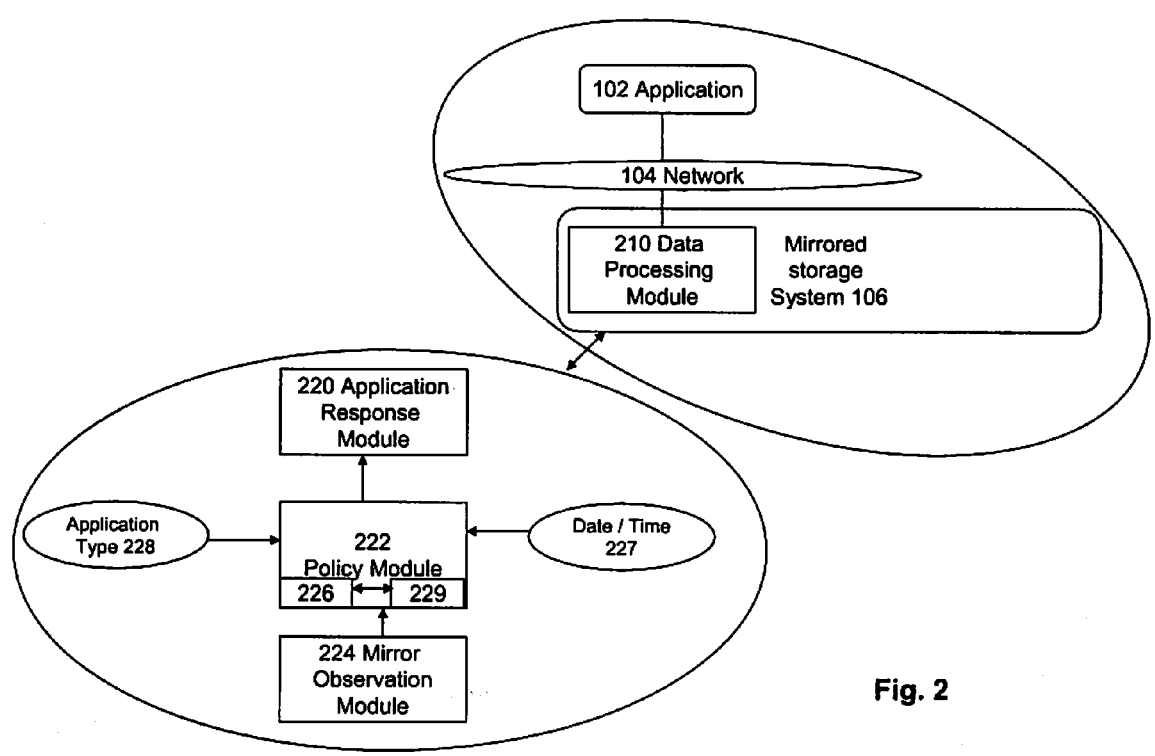
FIG. 2 shows a mirrored storage system according to the present invention.

The diagram of FIG. 2 illustrates the invention as a modification of, or a supplement to, a prior art mirrored storage system 106, which is described above in connection with FIG. 1. This supplement comprises the following modules with the objective to automatically adjust the RPO currently applied: Application Response Module 220, Mirror Observation Module 224, and Policy Module 222.

The mirrored storage system 106 may support mirroring functions such as DS8000 PPRC (Peer-to-Peer Remote Copy) or DS4000 Enhanced Remote Mirroring. It can also be a system supporting software based mirroring such as LVM Mirroring, or some application initiated mirroring like TSM Mirroring. Furthermore, the mirrored storage system 106 comprises a data processing module 210, receiving application write commands from applications 102 via network 104 and communicating said application write commands to the application response module 220.

Furthermore, the application response module 220 obtains a response for said write command from the policy module 222, and transmits responses to said application write commands to the data processing module 210. These application responses are generated by the policy module 222 depending on mirror state information retrieved from the mirror observation module 224 and the current RPO instructions for the particular application which is stored in non-volatile memory 229 pertaining to policy module 222.

In the here-described embodiment the mirror observation module 224 observes the mirror links 112 and mirror relationships between mirror pairs 114, 116 to discover and identify the current mirror state. There are three different mirror states to be monitored: Working state (i.e., Mirror is working), Degraded state (i.e., Mirror link reports errors but is still working), and Offline state (i.e., Mirror link is offline). In addition, the mirror observation module 224 may deliver the time a particular mirror link or mirror relationship is offline.

If a write command is received, the current mirror state as well as the offline time are determined by the mirror observation module 224 and reported to the policy module 222. As the policy module 222 has access to the configurable time-varying Recovery Point Objectives (RPO), which are stored in non-volatile memory 229, of the applications accessing said mirrored storage system 106, the policy module 222 is able to generate an application response for a given application write command on the basis of the actual mirror state information and the application's RPO requirement set for the current time. Then, the application response module 220 transmits the appropriate response either directly to the corresponding application or alternatively to the data processing module 210.

The applications 102 accessing the mirrored storage system 106 can send the corresponding RPO value representing the RPO requirement to the mirrored storage system 106 as part of a command. The SCSI-3 MODE SELECT command can be used with a previously undefined mode page, for example 0x0E. The RPO value for each application or group of applications is stored in a tabular form in nonvolatile memory 229 pertaining to policy module 222.

In one embodiment of the invention, the association of an application to the appropriate RPO value is done through the World Wide Node Name (WWNN) of the server hosting the application or through the World Wide Port Name (WWPN) of the I/O port the application is communicating with the mirrored system. WWNN and WWPN are well known in the art in regard to Fibre Channel based Storage Area Networks (SAN) such as network 104. Other techniques for SANs like Internet SCSI (iSCSI) use similar means like WWNN and WWPN. These are unique identifiers which are part of the data transfer protocol between an application 102 and a mirrored system 106. Thus, the WWNN and WWPN can be identified by the mirrored system upon reception of a command by the application such as a MODE SELECT command or a WRITE command. When the mirrored system receives a RPO value from an application via the MODE SELECT command, it can associate the WWNN or WWPN of the server executing the application to the RPO value. This tabular mapping is stored in the non-volatile memory 229 and maintained by the policy module 222.

In an alternative embodiment of the invention, the RPO requirement of a particular application is configured by the user. The application's RPO requirement is based on timing, an example for which is given in the following Table I:

TABLE I

Example RPO Requirements

| Application Name | Timing | RPO Requirement |
|---|---|---|
| App1 | 08:00 AM-06:00 PM | 0 |
| App1 | 06:00 PM-08:00 AM | 120 |

The application is denoted by the application name which may refer to a WWNN and WWPN. For each application accessing the mirrored storage system 106 one or more time ranges can be defined with an appropriate RPO requirement. In Table I the first row indicates that for application app1, a RPO requirement of 0 minutes is configured between 8 AM and 6 PM. After 6 PM until 8 AM the next day the RPO requirement for application app1 is 120 minutes, which is indicated by the second row of Table I. As the current RPO may depend on the actual date and time, the policy module 222 communicates with a unit 227 providing this information. The information of Table I are stored in non-volatile memory 229.

Another embodiment defines the type of an application, which can either be Critical, or Non-Critical. The system then assigns an RPO requirement based on the type of the application, thereby the application type is mapped to the RPO requirement, an example for which is shown in the following Table II:

TABLE II

Critical versus Non-Critical

| Application Name | Application Type | Timing | Derived RPO Requirement |
|---|---|---|---|
| App1 | Critical | 8 AM-6 PM | 0 |
| App1 | Non-Critical | 6 PM-8 AM | 240 |

The application is identified by the application name, which may refer to WWNN or WWPN identifiers. An application type is assigned to each application listed in Table II. The association of an application to an application type is user configurable in Table II. The type of an application may change over time and Table II offers the option of configuring time-based schedules. Based on the application type the system derives an RPO requirement which is 0 minutes in the first row if App1 is of Type "Critical" and 240 minutes (4 hours) in the second row if App1 is of Type "Non-Critical". As the current RPO may depend on the application type the policy module 222 communicates with a unit 228 providing this information.

When the RPO requirements are based upon the application type, it is useful to create application groups with similar characteristics, such as criticality, value, or performance requirements. The RPO requirements are then easily managed for whole groups, with any pertinent changes affecting all applications within such a group. For maintaining the group characteristics an "Application Group RPO Classification" is established as additional table information. Grouping of like applications allows the management of the different RPO requirements for a large number of applications to be handled more efficiently. This strategy greatly supports implementation and management of RPO policies. The information of Table II is stored in non-volatile memory 229.

In an alternate embodiment of the invention, the RPO value is associated to a storage container (e.g., LUN for disk subsystems, file system for file server or Network Attached Storage (NAS) server), which in fact is associated with an application. Storage containers thereby reside on the mirrored storage system 106. This is advantageous in virtualized environments where multiple virtualized server and application share the same WWNN and WWPN and in clustered or grid environments where an application can be migrated from one server to another and thus change its WWNN and WWPN over the time. Since the storage containers are copied by the mirrored storage system 106 and the storage containers are associated with applications, this approach allows to specify the RPO values for application even in such virtualized and clustered environments. The relationship between applications, RPO value and storage container can be handled best via the external management interface of the mirrored storage system 106.

The policy module 222, shown in FIG. 2, comprises an RPO reduction module 226 implementing a process to manage requests to reduce the RPO time. The function of this RPO reduction module 226 will be explained further in connection with the flow chart of FIG. 5.

Figure 3:
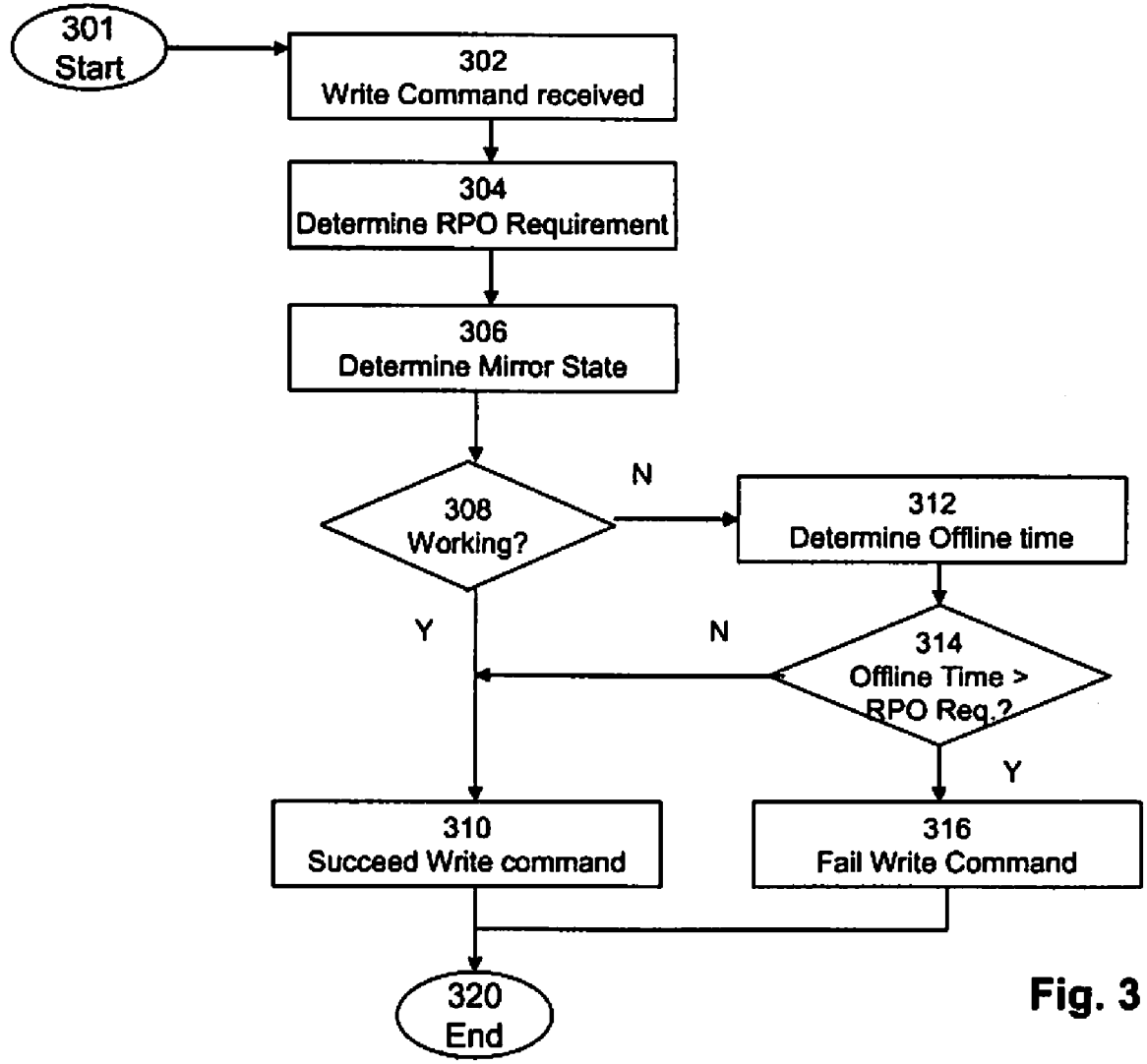
FIG. 3 shows a flowchart illustrating the method for storing data in a mirrored storage system according to the present invention.

The flow chart of FIG. 3 explains how to store data in a mirrored storage system as described. The process starts at step 301 and continues to step 302 where a write command is received from an application 102. In the here-described embodiment, the write command is received by data processing module 210 pertaining to the mirrored storage system 106. The data processing module 210 notifies the application response module 220 which notifies the policy module 222 about the reception of a write command. Then, the policy module 222 determines the current RPO requirement of the corresponding application in step 304 which is stored in non-volatile memory 229. This information is either provided by the application, or it is retrievable as tabular information as described previously. In step 306 the mirror observation module 226 determines the mirroring state. This is done by observing the mirror link between the storage systems 108 and 110 and by using the interfaces provided by those storage systems 108/110 including APIs and command line interfaces (CLI) known in the art for mirrored storage systems. The process flows to step 308 where the policy module 222 determines whether the mirroring state is working.

If the answer is yes, the process flows to step 310 where the write command is allowed by the application response module 220, which instructs the data processing module 210 to perform the write command as usual, writing the data to the primary system and copying the data to the secondary system. The process flows to the end 320.

If the answer in step 308 is NO the process flows to step 312 where the mirror observation module 224 determines the time the mirror link has been offline. Then the process flows to step 314 where the policy module 222 compares whether the offline time of the mirror is greater than the RPO requirement detected in step 304. If the answer is YES, the application response module 220 instructs the data processing module 210 to fail the write command in step 316 and the process flows to the end 320. The reason for failing the write command at this point is that the RPO requirement of the application can not longer be met because the link to the secondary system is not working or the mirror pair relationship is broken.

Otherwise, if the answer in step 314 is NO the process flows to step 310 where the application response module 220 instructs the data processing module 210 to allow the write command. From step 310 the process flows to the end.

When a data block is written to a mirrored storage system and the RPO is greater than zero the data is written to the primary system first and then the data block is put in a queue for copying to the secondary system. In an advantageous embodiment of the present invention a parameter "RPO_System" and a parameter "RPO_data" are associated to each data block in the queue for queue management. The parameter "RPO_System" is based on the RPO set by or for the corresponding application and the parameter "RPO_data" represents the time the data block is in queue. Queue management is provided using RPO as the primary criteria for copy such that the queue for writing is sorted by the value of RPO_System and RPO_data, with the smallest value being written first.

Figure 4:
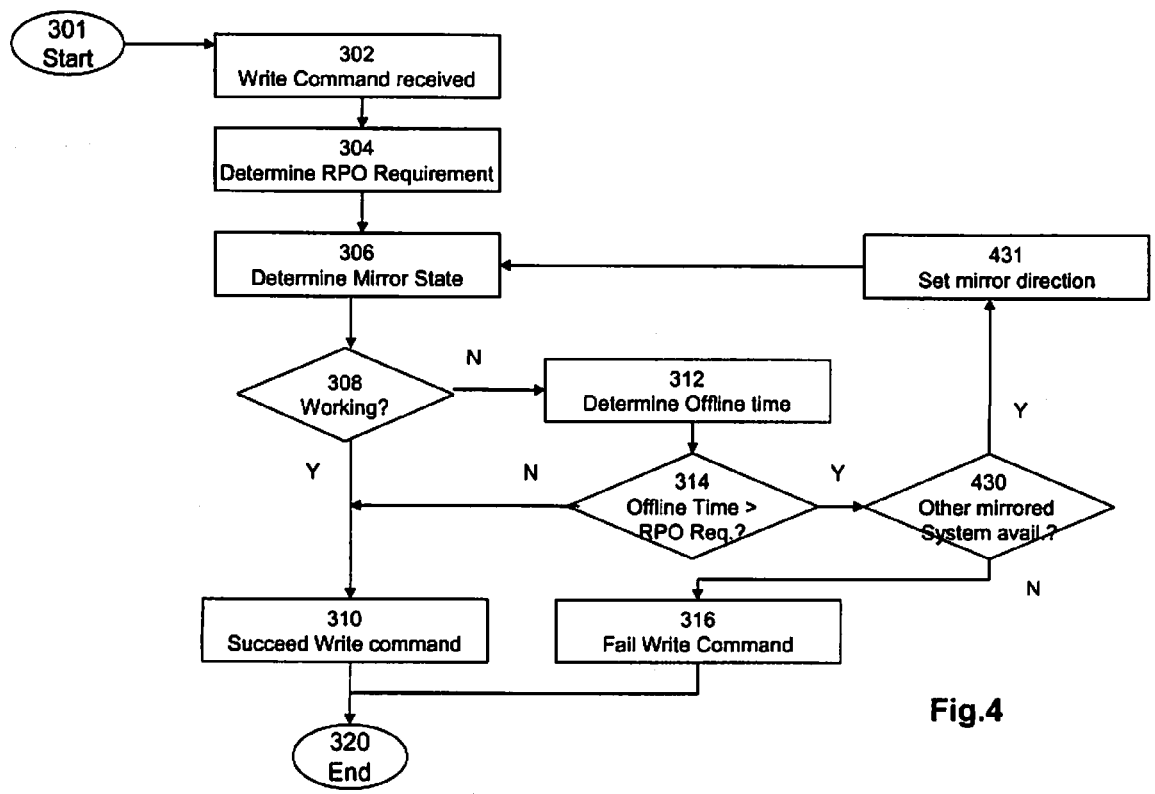
FIG. 4 shows a flowchart illustrating an advantageous modification of the method illustrated in FIG. 3.

FIG. 4 illustrates a modification of the method to store data shown in FIG. 3. If the data cannot be mirrored to the second storage system, the first storage system attempts mirroring the data to a third storage system. In case of FIG. 4, the system will automatically determine whether another storage subsystem is available for execution of the application's write request. This is done by the Application Response Module 220 in the case of a RPO policy violation (step 314) and takes place before a FAIL message is sent back to the application. If another subsystem is available within the mirrored storage system to fulfill the write request in step 430, the mirror is redirected in step 431 and the steps making up the RPO policy check (steps 306, 308, 312, 314) are performed again with regard to the new storage system. Assuming there is no RPO policy violation (step 314) using the other storage system and the I/O request can be fulfilled, the Application Response Module 220 sends back a SUCCEED message. Only if no subsystems are available will a FAIL message will be sent back to the application, at step 316.

To make this mechanism more flexible, certain policies are configurable in the policy module 222; for example, it can be configured for which application or application groups this alternative subsystem check should be performed or how many times the check should be attempted before a failure is determined.

The flowchart presented in FIG. 4 explains this enhancement. From step 314, where it has been determined that the mirror system has been offline for a length of time greater than the RPO requirement, the process flows to step 430 where the availability of another mirrored storage system is evaluated. If another mirror system is available, the mirror direction is set to the new mirrored system in step 431 and the process flows back to step 306 where the mirror state to said new mirrored system is determined. The process continues as previously described in FIG. 3. If the decision in step 430 is that no other mirrored storage system is available, the process continues to step 316.

Figure 5:
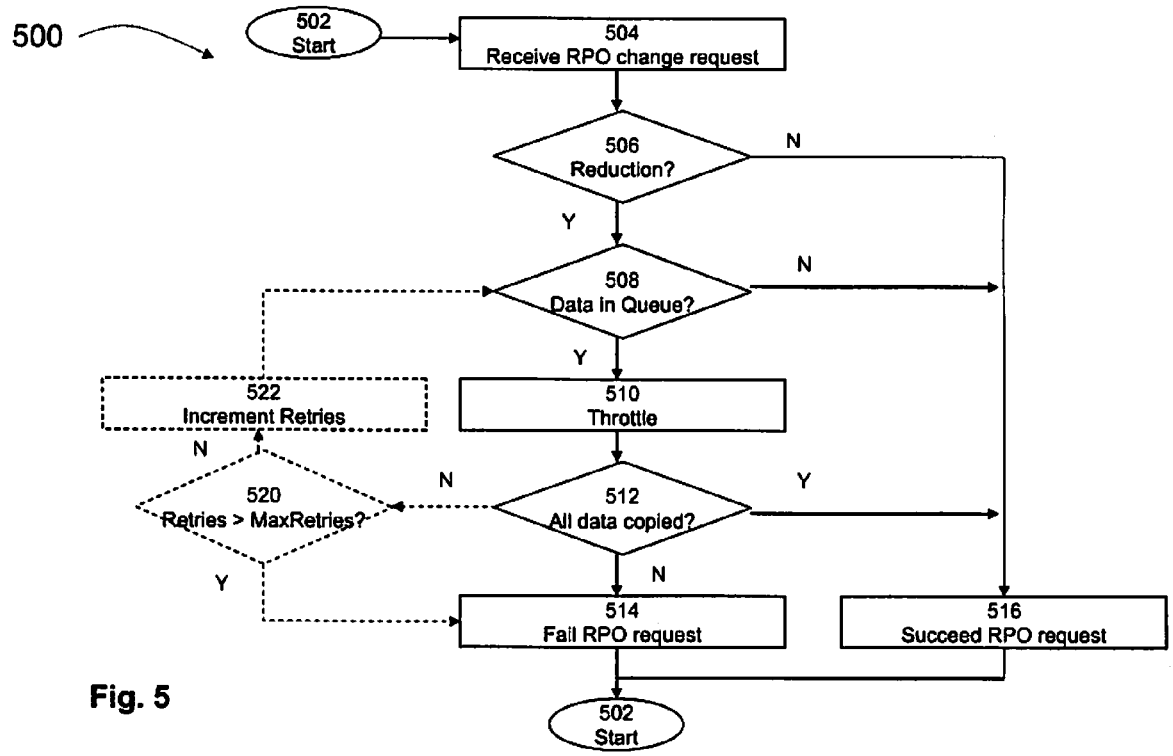
FIG. 5 shows a flowchart illustrating the handling of an RPO change request in a mirrored storage system according to the present invention.

FIG. 5 presents a process 500 incorporating the logic for the RPO reduction module 226 according to this invention. This logic is always executed if a RPO adjustment causing a change to a RPO value is requested. When an application requests a new RPO value it may use the MODE SELECT command. This command is received by the data processing module 210 in FIG. 2 of the storage system and passed on to the application response module 220 which passes it on to the policy module 222 and RPO reduction module 226. The process starts in step 502 and flows to step 504 where the RPO change request is received by the RPO reduction module 226. The process continues to step 506 where it is determined whether the RPO change request causes a RPO reduction. Thereby the RPO reduction module 226 compares the current RPO as stored in the non-volatile memory 229 to the RPO requested (received as part of the MODE SELECT command) and if the RPO requested is less than the current RPO, the decision in step 506 will be yes. If the decision is yes the process flows to step 508. Otherwise, the process flows to step 516 explained later.

In step 508 the process checks whether there is data in the copy queue. In an alternative embodiment the process checks whether the data in the copy queue is older than the RPO requested. If the decision in step 508 is yes the process flows to step 510. Otherwise, the process flows to step 516, which is explained below.

In step 510 the process initiates a throttling of I/O commands from the application 102 in order to accelerate the data copy. By increasing the response time to application I/O commands, system resources that would be used to execute said I/O commands are freed so that they can be applied to synchronizing the mirrored systems. Throttling may be performed for a predetermined time. After that time the process continues to step 512 where it checks whether all data which needed to be copied has been copied. If the answer is yes, the process flows to step 516. In step 516 the RPO change request is implemented, causing the RPO parameter for the requesting application to change and the requesting application obtains a successful completion message.

If the answer in step 512 is no, the process flows to step 514 where the RPO change request is failed. In this case the requested RPO change is not implemented and the requesting application receives an error message.

In an alternate embodiment, shown in dotted lines in FIG. 5, the process 500 attempts several times to reduce the RPO followed by throttling intervals. In this embodiment, if the decision in step 512 is no the process continues to step 520 instead of step 514. In step 520 it is checked if the number of attempts (parameter Retries) is greater than the maximum allowable retries (parameter MaxRetries). If the answer is yes, the process flows to step 514. If the answer is no, the process flows to step 522 where the retry counter (parameter Retries) is incremented by 1. From step 522 the process flows to step 508, explained previously. The MaxRetry parameter is a user configurable parameter which is stored in non-volatile memory 229 of policy module 222. For example, if this parameter is set to 3, this means that a total of 3 throttling attempts are done before the RPO change request fails in step 514.

From steps 514 and step 516 the process 500 flows back to the beginning at step 502.

The present invention is not limited to mirrored disk subsystems, but is also applicable to other mirrored storage technologies, such as disk virtualization systems, tape subsystems, tape virtualization systems, optical subsystems, holographic storage systems, as well as applications like file systems, databases, backup systems, and archive systems. In addition to a mirrored storage system configured according to the invention, and methods for running such a mirrored storage system, a computer program product is claimed which is stored on a computer usable medium and comprises computer readable program means for causing a computer to run a mirrored storage system according to the described invention. This computer usable medium may include magnetic or optical tape; optical disks which may include magneto-optical, phase change, Digital Versatile Disk (DVD), or Blu-Ray disks; holographic disks; solid state memory; floppy disks; hard disks; and the like.

The invention claimed is:

1. A mirrored storage system for applications, wherein an application accesses said mirrored storage system via a network, said mirrored storage system comprising:
   a first storage system and at least a second storage system, wherein said first storage system and said second storage system are connected via at least one mirror link;
   an application response module which provides a respective application response responsive to each of a plurality of application write commands, each application write command issued by a respective application of a plurality of applications accessing said mirrored storage system, each said application having a respective configurable time-varying Recovery Point Objective (RPO);
   a mirror observation module, observing said mirror link and retrieving mirror state information; and
   a policy module communicating with said mirror observation module and said application response module and having access to the respective configurable time-varying RPO of each of the applications accessing said mirrored storage system, wherein said policy module generates the respective application response corresponding to each of a plurality of application write commands, each respective application response being based on the actual mirror state information and the respective RPO requirement of the respective application which issued the corresponding application write command set for the current time of the respective application write command;
   wherein the respective application response specifies whether to accept the corresponding application write command.

2. The system according to claim 1, wherein said mirror observation module identifies the mirror state and delivers the time a particular mirror link or mirror relationship is offline.

3. The system according to claim 1, wherein said policy module comprises an RPO reduction module managing requests to reduce the RPO time.

4. The system according to claim 1, wherein said policy module comprises means for varying the bandwidth of said mirror link on demand.

5. The system according to claim 1, further comprising:
   means to retrieve information about the internal state of said mirrored storage system and at least about the state of said first storage system, and
   means to automatically adjust the RPO and/or the bandwidth of the mirror link depending on the current state of said mirrored storage system.

6. A method for operating a mirrored storage system comprising a first storage system and a second storage system connected via a mirror link, the method comprising:

receiving a write command specifying data generated by an application to be written the mirrored storage system;

responsive to receiving the write command, determining a Recovery Point Objective (RPO) requirement of said application set for the current time, said RPO requirement of said application being time-varying;

responsive to receiving the write command, determining the actual mirror state; and responsive to receiving the write command, determining a responsive action to the write command based on said RPO requirement of said application set for the current time and said actual mirror state, wherein the responsive action comprises:

if the mirror link is working, then writing the data to said first storage system and to said second storage system;

if the mirror link is not working, then: (a) determining the offline time of the mirror link; (b) if said offline time is less than said RPO requirement, then writing the data to said first storage system and putting the data in a queue for writing to said second storage system; and (c) if said offline time is not less than said RPO requirement, then preventing putting the data in said queue for writing to said second storage system.

7. The method according to claim 6, wherein the current RPO requirement is set by said application.

8. The method according to claim 6, wherein the RPO requirements for at least one application are configured and provided independently from said application as table information to be accessed.

9. The method according to claim 6, wherein the current RPO requirement is adjusted automatically depending on the internal state of said mirrored storage system depending on the current state of said first storage system.

10. The method according to claim 9, further comprising:
if said mirror link is not working and if said offline time is more than said RPO requirement, generating a failure message in response to said application write command.

11. The method according to claim 9, further comprising:
if said mirror link is not working and if said offline time is more than said RPO requirement, checking whether a further mirrored storage system is available for execution of said write command of said application; and
if a further mirrored storage system is available, setting the mirror direction to said further storage system and returning to said determining the actual mirror state;
otherwise generating a failure message as response to said application write command.

12. The method for operating a mirrored storage system according to claim 6, wherein the RPO currently applied for mirroring data can only be reduced if the data in a queue for writing to said further storage system is not older than the new requested RPO, or if there is no data in said queue.

13. The method according to claim 12, wherein, if an RPO reduction request cannot be honored, the I/O requests from an application accessing said mirrored storage system are throttled as long as said data in said queue has not been written to said further storage system.

14. The method for operating a mirrored storage system according to claim 12, wherein the bandwidth of the mirror link is increased if an RPO reduction request cannot be honored.

15. A computer program product stored on a computer usable medium for operating a mirrored storage system having a first storage system and a second storage system connected via a mirror link, the computer program product comprising at least one computer readable program for causing a computer to perform a method comprising:

receiving a write command specifying data generated by an application to be written the mirrored storage system;

responsive to receiving the write command, determining a Recovery Point Objective (RPO) requirement of said application set for the current time, said RPO requirement of said application being time-varying;

responsive to receiving the write command, determining the actual mirror state; and responsive to receiving the write command, determining a responsive action to the write command based on said RPO requirement of said application set for the current time and said actual mirror state, wherein the responsive action comprises:

if the mirror link is working, then writing the data to said first storage system and to said second storage system;

if the mirror link is not working, then: (a) determining the offline time of the mirror link; (b) if said offline time is less than said RPO requirement, then writing the data to said first storage system and putting the data in a queue for writing to said second storage system; and (c) if said offline time is not less than said RPO requirement, then preventing putting the data in said queue for writing to said second storage system.

16. The computer program product according to claim 15, wherein the current RPO requirement is set by said application.

17. The computer program product according to claim 15, wherein the RPO requirements for at least one application are configured and provided independently from said application as table information to be accessed.

18. The computer program product according to claim 15, wherein the current RPO requirement is adjusted automatically depending on the internal state of said mirrored storage system depending on the current state of said first storage system.

19. The computer program product according to claim 18, wherein the computer readable program means for causing a computer to perform the method further comprising:
if said mirror link is not working and if said offline time is more than said RPO requirement, generating a failure message in response to said application write command.

* * * * *